(12) United States Patent
Hyytiainen

(10) Patent No.: US 8,792,069 B2
(45) Date of Patent: Jul. 29, 2014

(54) CHANGING THE APPEARANCE OF AN ELECTRONIC DEVICE

(75) Inventor: Ilkka Antero Hyytiainen, Espoo (FI)

(73) Assignee: Nokia Corporation, Espoo (FI)

( * ) Notice: Subject to any disclaimer, the term of this patent is extended or adjusted under 35 U.S.C. 154(b) by 991 days.

(21) Appl. No.: 12/679,350

(22) PCT Filed: Sep. 27, 2007

(86) PCT No.: PCT/IB2007/053929
§ 371 (c)(1),
(2), (4) Date: Apr. 19, 2010

(87) PCT Pub. No.: WO2009/040611
PCT Pub. Date: Apr. 2, 2009

(65) Prior Publication Data
US 2010/0220280 A1 Sep. 2, 2010

(51) Int. Cl.
*G02F 1/1347* (2006.01)
*G02F 1/1333* (2006.01)
(52) U.S. Cl.
USPC .............................................. 349/74; 349/86
(58) Field of Classification Search
None
See application file for complete search history.

(56) References Cited

U.S. PATENT DOCUMENTS 5,142,644 A * 8/1992 VanSteenkiste et al. ........ 349/86
2005/0052341 A1 * 3/2005 Henriksson ..................... 345/4

FOREIGN PATENT DOCUMENTS

| EP | 1 665 202 | 3/2005 |
| GB | 2 391 073 A | 1/2004 |
| JP | 2002-290521 | 10/2002 |
| JP | 2004-069926 | 3/2004 |
| JP | 2004-247779 | 9/2004 |
| WO | WO 2004/013687 A1 | 2/2004 |

* cited by examiner

*Primary Examiner* — Wen-Ying P Chen
(74) *Attorney, Agent, or Firm* — Harrington & Smith

(57) ABSTRACT

An apparatus includes a layer including a material which has an electrically controllable transparency. At least a part of the layer is arranged to cover at least a part of a surface of a display. The apparatus further includes electrical contacts arranged to enable an electrical control of the transparency of the layer. When employing such an apparatus, it may be determined which appearance the layer is to assume. The transparency of the layer can then be controlled in accordance with the determined appearance.

21 Claims, 4 Drawing Sheets

CHANGING THE APPEARANCE OF AN ELECTRONIC DEVICE

FIELD OF THE INVENTION

The invention relates to changing the appearance of an electronic device.

BACKGROUND OF THE INVENTION

There is a constant endeavor to improve and vary the look of electronic user devices.

Equally, it is a constant aim to reduce the power consumption of electronic devices, in particular of portable electronic devices.

Electronic user devices often have a display that can be in different modes. The display of television set, for instance, can usually be in an on mode or in an off mode. That is, the screen presents either an image or it appears as a black or gray plane. The display of a mobile phone may be for example in one of three modes. In an active mode, a display may present a large variety of information to a user in an interactive manner and using a high luminance. In a power save mode, the display may be completely dark or present reduced information in a transflective mode without backlight, like a clock, depending on user settings. This mode is meant to provide basic critical information to the user but also siginificantly save power while the mobile phone is not in active use. Nevertheless, the consumed power is still considerable. In an off mode, the entire device is switched off and the display appears as a dark or gray field.

The appearance of a display in a power save mode or an off mode is often not particularly pleasing to the eye of a user. It is possible to hide a switched off display behind rolling or hinged doors or behind a decorative structure that can be clipped in front of the display when not in use.

SUMMARY

Hiding a display of a device behind a door or some other structure when the device is not used might be feasible with stationary devices in some cases. In other cases, in particular with portable electronic devices, in contrast, such an approach might not be feasible in a sensible manner. In any case, it is rather burdensome to the user.

An apparatus is described, which includes a layer comprising a material which has an electrically controllable transparency. At least a part of the layer is arranged to cover at least a part of a surface of a display. The apparatus further includes electrical contacts arranged to enable an electrical control of the transparency of the layer.

The described apparatus can be a complete electronic device or a component for an electronic device, like a cover. In the latter case, the mentioned display does not necessarily belong to the apparatus itself. In this case, the described arrangement of the layer has to be understood such that due to its arrangement, the layer covers at least a part of a surface of the display when the apparatus is combined with the other components of the electronic device, including the display.

Moreover a method is described which comprises determining an appearance which a layer of an electronic device is to assume. The layer comprises a material which has an electrically controllable transparency and at least a part of the layer is arranged to cover at least a part of a surface of a display of the electronic device. The method further comprises electrically controlling the transparency of the layer in accordance with the determined appearance.

Moreover, a computer program product is proposed, in which a program code is stored in a computer readable medium. When executed by a processor, the program code determines an appearance which a layer of an electronic device is to assume, wherein the layer comprises a material which has an electrically controllable transparency and wherein at least a part of the layer is arranged to cover at least a part of a surface of a display of the electronic device. The program code further causes an electrical control of the transparency of the layer in accordance with the determined appearance.

The computer program product could be for example a separate memory device, or a memory that is to be integrated in an electronic device.

The invention is to be understood to cover such a computer program code also independently from a computer program product and a computer readable medium.

By covering a display of an electronic device at least partially with a layer, which can be controlled so that it is either transparent or opaque, the display can be hidden automatically when it is not needed without any effort by the user.

The layer may be provided for example in the form of a film or a panel.

The layer may be arranged to cover the entire surface of the display or to cover only a part of the surface of the display. Further, the layer may be arranged to cover only the surface of the display or to cover a surface exceeding the surface of the display. If desired, the entire surface of an electronic device could be covered by the layer.

In an exemplary embodiment, the degree of transparency of the layer as a whole can be set. The entire layer can be controlled for instance such that it is switched between being transparent and being opaque. In an alternative embodiment, it is also possible to control the layer to assume in some parts a transparent appearance and in other parts an opaque appearance.

For instance, if the layer is arranged to cover a surface exceeding the surface of the display, only the area of the layer covering the display could be switchable between being transparent and being opaque. In this case, electrical contacts might be required only in the area of the layer that is intended to be switchable.

Further, the layer could also be provided with informative or decorative capabilities like displaying simple text, graphics such as a clock, decorative patterns, etc. To this end, the electrical contacts of the apparatus may be arranged to enable an individual electrical control of the transparency of different parts of the layer.

In case an individual electrical control of the transparency of different parts of the layer is enabled, the layer could also be controlled to enable a view onto a selected area of the display only. The display could then be used for instance for a presentation exclusively in an area behind the transparent part.

The apparatus may further comprise a control arrangement configured to electrically control the transparency of the layer by means of the electrical contacts. If the apparatus is only a component for an electronic device, the control arrangement could also be implemented partly or entirely in other components of the device.

The control arrangement can be implemented in hardware and/or software. It may be realized for instance by a processor executing software program code. Alternatively, it could be realized for instance by a circuit that is designed to realize the required functions.

The electrical control of the layer is performed such that the layer assumes a currently desired appearance. Determining an appearance which the layer is to assume may be performed as well by the control arrangement.

In case the layer is to be provided with informative or decorative capabilities, electrically controlling the transparency of the layer comprises individually controlling the transparency of different parts of the layer to present a selectable pattern in accordance with a determined appearance.

For determining an appearance which the layer is to assume, it may be monitored whether the display is in an active mode. At least the portion of the layer covering the display can then be controlled to be transparent when the display is in an active mode. As a result, the user will see the presentation of the display whenever the display is in an active mode.

In addition, it would be possible to differentiate between other display modes. For instance, in a power save mode, some simple information or decoration could be presented by the layer.

The layer may comprise any material having a transparency that can be controlled electrically, for instance by impressing a voltage on the layer or by feeding a current through the layer. If the material is a material that is opaque, for instance completely one colored, when no voltage is applied, it can be ensured that the display is also hidden without causing any power consumption when the electronic device is switched off completely.

One possible material for the layer is a polymer network liquid crystal (PNLC) material. In case no voltage is applied to a PNLC material, it is in a diffusion mode in which incoming light is scattered, since the orientation of contained liquid crystal molecules is irregular. As a result, the layer is completely white. An impressed voltage, however, aligns the liquid crystal molecules so that the layer becomes transparent. Other polymer dispersion liquid crystal materials would be other possible examples for the material of the layer.

Another possible material for the layer is for example a material called Onyx™ developed by Citala. This material has two modes: fully transparent and colored diffusing.

It is to be understood that it would also be possible to combine different materials in the layer, for instance to be able to present different colors when the layer is not in a transparent mode.

The invention can be employed with any kind of electronic device comprising a display. It can be employed for portable devices, like mobile phones or personal digital assistants (PDA), as well as for stationary devices, like television sets.

It is to be understood that all presented exemplary embodiments may also be used in any suitable combination.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF THE INVENTION

Figure 3:
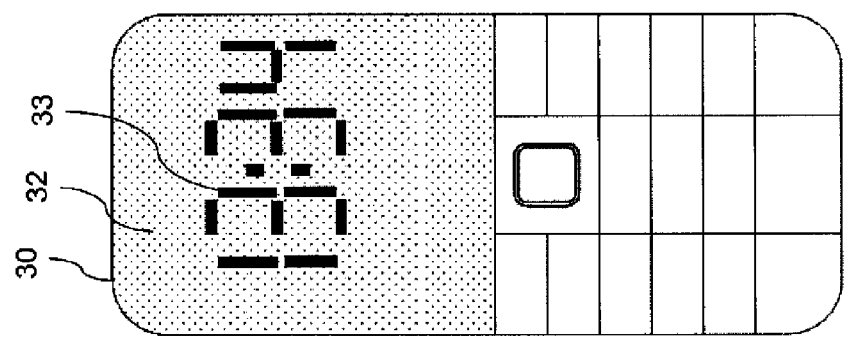
FIG. 3 is a schematic diagram of a mobile phone with an inactive display that is hidden behind a largely milky white layer, the layer covering the entire upper front part of the mobile phone and presenting simple information.
Figure 2:
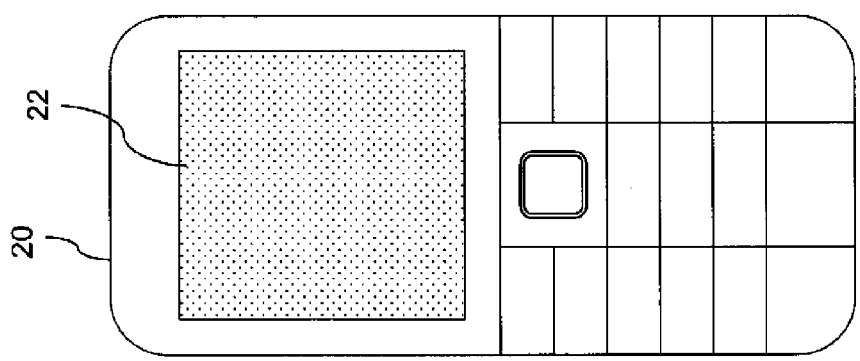
FIG. 2 is a schematic diagram of a mobile phone with an inactive display that is hidden behind a milky white layer.
Figure 1:
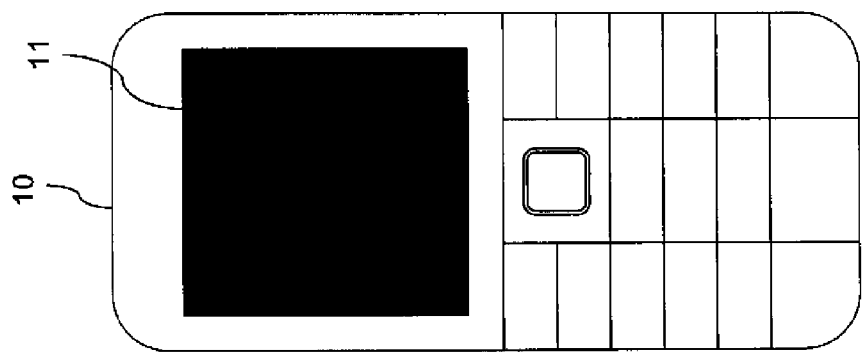
FIG. 1 is a schematic diagram of a mobile phone presenting an inactive black/gray display.

FIGS. 1 to 3 illustrate the effect that may be achieved by changing the appearance of an electronic device in accordance with exemplary embodiments of the invention.

FIG. 1 is a schematic diagram of a conventional mobile phone 10, which has been switched off. The display 11 appears as a dark area. In particular if the mobile phone has a brightly colored cover, such a dark area might seem rather bleak to a user. A similar effect would result if the display 11 was set to a power save mode, even though in this case, some simple information or pattern could be presented.

FIG. 2 is a schematic diagram of another mobile phone 20, which may correspond to the mobile pone 10 of FIG. 1, but which has been supplemented in accordance with an exemplary embodiment of the invention.

In this embodiment, a thin layer 22 has been arranged to cover exactly the visible surface of the display. The layer 22 is made of a material having a transparency that can be controlled electrically.

The layer 22 is set to be transparent whenever the display is active. When the display is active, the mobile phone 20 thus looks just like a conventional mobile phone. Otherwise, the layer 22 is set to be opaque, for instance milky white, as illustrated in the situation of FIG. 2. The layer 22 thus hides the display whenever the display is not needed.

FIG. 3 is a schematic diagram of a mobile phone 30, which may correspond again to the mobile pone 10 of FIG. 1, but which has been supplemented in accordance with another exemplary embodiment of the invention.

In this embodiment, a thin layer 32 has been arranged on the entire upper front surface of the mobile phone 30, including the display. The layer 32 is made again of a material having a transparency that can be controlled electrically.

The layer 32 is set to be transparent whenever the display is active. Otherwise, the layer 32 is set to be mainly opaque. In this case, however, the electrical control of the layer 32 is designed such that selected parts of the layer 32 can remain transparent or partly transparent when the display is not active. This allows presenting simple information or decorations that are conventionally presented by a display in a power save mode. In the situation presented in FIG. 3, time is indicated by a transparent pattern 33, while the surrounding area 32 is driven to be opaque.

The layer 32 thus hides the display, when it is not needed. Since the layer 32 covers more surface of the mobile phone 30 than the display, the entire upper part appears in a uniform coloring. Moreover, any information or decoration may be presented on a larger area than the display, since the layer has a larger active area. At the same time, a presentation of simple information or decorations can be achieved with less power than required by a display in the power save mode.

It is to be understood that the layer 32 could cover up to the entire surface of an electronic device.

Figure 4:
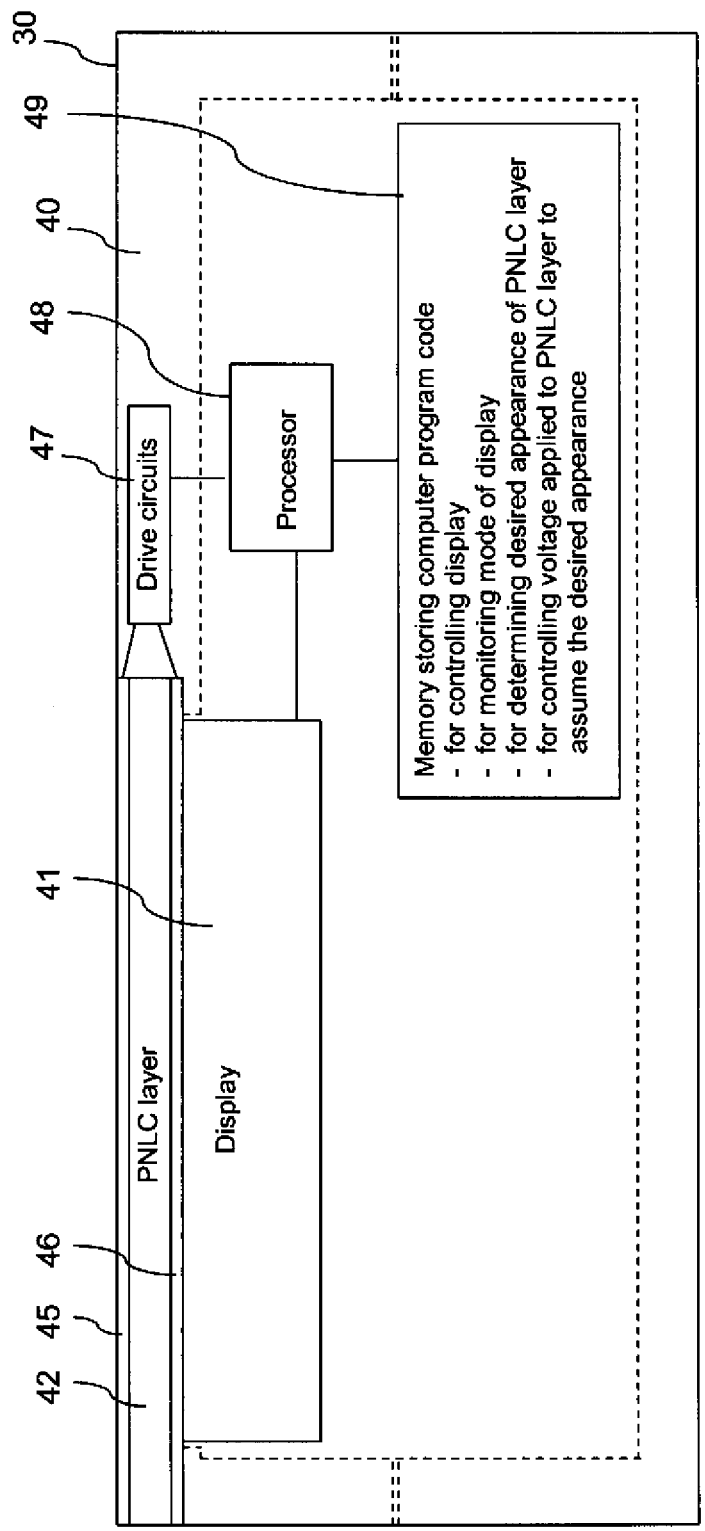
FIG. 4 is a schematic block diagram of the mobile phone of FIG. 3.

FIG. 4 presents an exemplary implementation of the mobile phone 30 of FIG. 3 in more detail. FIG. 4 is more specifically a schematic block diagram presenting selected components of mobile phone 30.

The mobile phone 30 comprises a conventional display 41. This display 41 can be for example a liquid crystal display (LCD), a light-emitting diode (LED) display or an organic light-emitting diode (OLED) display.

The surface of the display 41 and some surrounding area is covered by a layer 42. The layer 42 is assumed by way of example to be a PNLC film, which is transparent when a voltage is applied and milky white when no voltage is applied. It is to be understood, however, that any other material which can be controlled electrically to change its transparency can be used as well. The layer 42 is provided on both sides with a transparent electrode arrangement 45, 46 for enabling the application of a control voltage. The electrode arrangement 45, 46 correspond to the electronic contacts according to the invention. The electrode arrangements 45, 46 may cover the entire layer 42, as shown in FIG. 4. Alternatively, the electrode arrangements 45, 46 could cover the layer 42 for example only in the area of the display 41. In this case, the part of the layer 41 not covered by the electrode arrangements 45, 46 would always be of a non-transparent milky white color.

The layer 42 and the electrode arrangements 45, 46 may be integrated for example in a removable cover 40 of the electronic device, which is indicated by dashed lines in FIG. 4. It is to be understood that in addition, a transparent protection layer (not shown) could be provided as the outermost layer of the mobile phone 30 in the area of layer 42.

In case the layer 42 is only to be switched between transparent and non-transparent, similarly as in the embodiment of FIG. 2, the electrode arrangements 45, 46 could simply comprise a transparent conductive film on each side of the layer 42. A voltage could then be applied across the layer 42 between those two films whenever display 41 is active. In case additional information is to be presented by the layer 42 as in the embodiment of FIG. 3, however, it has to be possible to apply a different voltage across different parts of the layer 42. This can be achieved in various ways. For example, a simple 7-segment segmentation could be used by arranging very thin isolated transparent conductive lines and transparent conductive segments connected to those. A voltage is then applied across the layer 42 at the location of the associated segment thus causing a visible change in the associated segment area.

It is to be understood that also a mixture of both approaches would be possible, if only a predetermined part of the layer 42 is to be able to present information.

The mobile phone 30 further comprises drive circuits 47 for providing the electrode arrangements 45, 46 with the respectively required voltage or voltages. The drive circuits 47 may include for instance all required transistors and include or have access to a power source. The drive circuits 47 could equally be integrated in the cover 40, but it could also belong to the components of the mobile phone 30 that are enclosed by the cover 40.

The mobile phone 30 comprises in addition a processor 48, which is configured to execute various computer program codes and to control different components of the mobile phone 30 accordingly. The processor 48 is connected to the display 41 and to the driver circuits 47. In addition, it is connected to a memory 49 of the mobile phone 30. The memory 49 stores program code, which may be retrieved by the processor 48 for execution.

The stored program codes include code for controlling the display 41, code for monitoring the mode of display 41, code for determining a currently desired appearance of the layer 42 and code for electrically controlling the layer 42 to assume the desired appearance.

It is to be understood that alternatively, the functions of the processor 48 executing stored program codes could be realized in hardware.

Figure 5:
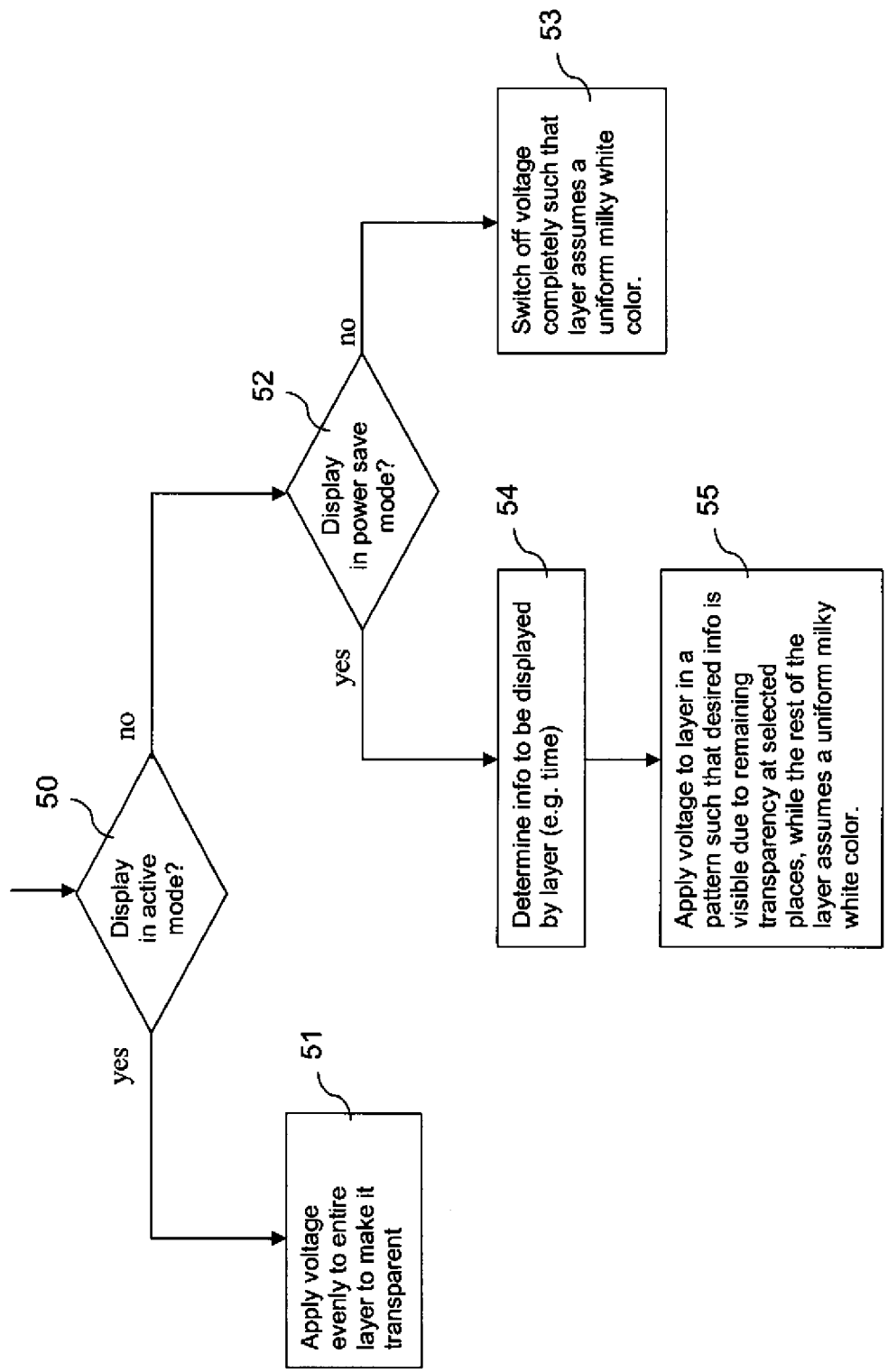
FIG. 5 is a flow chart illustrating an operation in the mobile phone of FIG. 4.

The control of the transparency of the layer 42 by means of the processor 48 executing program code retrieved from memory 49 will now be explained with reference to the flow chart of FIG. 5.

The processor 48 controls the display 41 based on input from various currently active applications, for example for presenting selection options on the display 41 and for changing a current presentation in accordance with some user input. The processor 48 may also set the display 41 to a power save mode, for example whenever there was no user input for along time. In the power save mode, the display 41 is always switched off completely and has a dark appearance as a result. No reduced information is displayed. The processor 48 may also switch off the display 41 completely, whenever the mobile phone 40 is switched off.

For controlling the layer 42, the processor 48 monitors the sate of the display 41. In this, it differentiates between active mode, power save mode and off mode.

If the current display mode is the active mode (step 50), the processor 48 causes the drive circuits 47 to apply the same constant voltage across the entire area of the layer 42 via the electrode arrangements 45, 46 (step 51). The voltage exceeds a predetermined limit, which is suited to render the layer 42 completely transparent. As a result, the user can clearly see any presentation on the display 41. Further, the user sees the color of the cover 40 surrounding the display underneath the layer 42.

If the current mode is not the active mode (step 50) but in the off mode (step 52), the processor 48 causes the drive circuits 47 to switch off any power supply from the electrode arrangement 45, 46 (step 53). As a result, the entire layer 42 and thus the entire upper front part of the mobile phone 30 appears in a milky white color.

If the current mode is the power save mode instead (step 52), the processor 48 determines at first whether any information or decoration is to be presented by the layer 42 in this case (step 54). To this end, the processor 48 may check for example user settings and/or default settings. These could be stored as well in the memory 49.

If the information that is to be presented in the power save mode is for example time, the processor 48 determines the current time.

Then, the processor 48 informs the drive circuits 47 for each part of the layer 42 which voltage is to be applied via the electrode arrangement 45, 46 (step 55).

In the example of FIG. 3, the predetermined high voltage, which results in a total transparency, is applied to parts 33 of the layer 42 that are suited to form a pattern representing current time. Since the display 41 is dark in the power save mode, time appears as black 7-segment numbers. A medium voltage, which reduces the transparency to some extent, is applied to a rectangular part 34 of the layer 42 surrounding the parts 33 used in the actual presentation. As a result, this rectangle 34 appears to be gray colored. To the rest of the layer 42, no voltage is applied so that it appears in a uniform milky white color.

The milky white color of the layer 42 may appear more cheerful to many users than the dark rectangle of the display 41 while the display 41 is switched off or in a power save mode.

Since a presentation of simple information via the layer 42 needs less power than a presentation of simple information via the display 41 in the power-save mode, power can be saved in addition.

The functions illustrated by the processor 48 executing program code from memory 49 can be viewed as means for determining an appearance which a layer of an electronic device is to assume, wherein the layer comprises a material which has an electrically controllable transparency and wherein at least a part of the layer is arranged to cover at least a part of a surface of a display of the electronic device. The functions illustrated by the processor 48 executing program code from memory 49 and/or the drive circuits 47 can be viewed as means for electrically controlling the transparency of the layer in accordance with the determined appearance.

The program codes stored in memory 49 can also be viewed as comprising such means in the form of functional modules.

Figure 6:
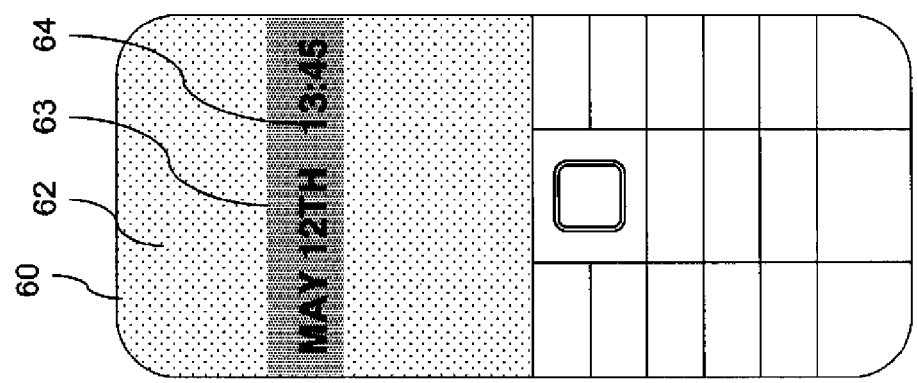
FIG. 6 is a schematic diagram of a mobile phone with a display that is hidden behind a milky white layer except for a small area presenting information.

FIG. 6 presents a variation of the embodiment of FIG. 3.

In this variation, a thin layer 62 having an electrically controllable transparency has been arranged again on the entire upper front surface of a mobile phone 60, including a display. The layer 62 is set to be opaque when the mobile phone 60 is switched off and set to be transparent when the entire display is to be used for a presentation to a user. Otherwise, the layer 62 may be set to be opaque except for a transparent part 63 allowing a user to see a presentation 64 on the display in an area behind this transparent part 63. In the latter case, the display can be in an active mode in which the full display is active, even though only a selected part of the viewing area is visible. Alternative, the display can be in a partial mode or low power mode, in which only a small area behind the transparent part 63 of the layer 62 is active. In order to enable low power consumption, the display is of transflective type and has no backlight on in this situation.

In the situation presented in FIG. 6, a rectangular area 63 of the layer 62 has been set to a transparent mode, while the rest of the layer 62 has been set to an opaque mode. The transparent rectangle 63 enables a user to view a part of the actual display. A partial mode is used for presenting time and date in the area behind the transparent rectangular area 63.

In the embodiment of FIG. 6, an electrically controllable layer is thus used to hide a part of a display, when a full display it is not needed.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto. Furthermore, in the claims means-plus-function clauses are intended to cover the structures described herein as performing the recited function and not only structural equivalents, but also equivalent structures.

What is claimed is:

1. An apparatus comprising:
   a layer comprising a material which has an electrically controllable transparency, wherein at least a part of the layer is arranged to cover at least a part of a surface of a display, and wherein at least a part of the layer is configured to be opaque and have a non-black color when no voltage is applied to the at least a part of the layer.

2. The apparatus according to claim 1, further comprising the display.

3. The apparatus according to claim 1, wherein the layer is arranged to cover a surface exceeding the surface of the display.

4. The apparatus according to claim 1, wherein the electrical contacts are arranged to enable an individual electrical control of the transparency of different parts of the layer.

5. The apparatus according to claim 1 further comprising electrical contacts arrange to enable an electrical control of the transparency of the layer.

6. The apparatus according to claim 5, further comprising a control arrangement configured to electrically control the transparency of the layer by means of the electrical contacts.

7. The apparatus according to claim 6, wherein the control arrangement is configured to monitor whether the display is in an active mode and to control at least the portion of the layer covering the display to be transparent when the display is in an active mode.

8. The apparatus according to claim 6, wherein the control arrangement is configured to individually control the transparency of different parts of the layer to present a selectable pattern.

9. The apparatus according to claim 1, wherein the layer comprises polymer network liquid crystal material.

10. The apparatus according to claim 1, wherein said apparatus is a cover for an electronic device.

11. The apparatus according to claim 1, wherein said apparatus is an electronic device.

12. The apparatus according to claim 1, wherein the at least a part of the layer is configured to be opaque and have a non-black color when the display is inactive, and wherein the display being inactive comprises the display being in at least one or more of: a power save mode, a partial display mode or an off mode.

13. The apparatus according to claim 1, wherein the material is configured to be substantially white when no voltage is applied thereto.

14. A method comprising:
   determining an appearance which a layer of an electronic device is to assume, wherein the layer comprises a material which has an electrically controllable transparency and wherein at least a part of the layer is arranged to cover at least a part of a surface of a display of the electronic device and wherein at least a part of the layer is configured to be opaque and have a non-black color when no voltage is applied to the at least a part of the layer; and
   electrically controlling the transparency of the layer in accordance with the determined appearance.

15. The method according to claim 14, wherein determining an appearance which the layer is to assume comprises monitoring whether the display is in an active mode and controlling at least the portion of the layer covering the display to be transparent when the display is in an active mode.

16. The method according to claim 14, wherein electrically controlling the transparency of the layer comprises individually controlling the transparency of different parts of the layer to present a selectable pattern in accordance with the determined appearance.

17. The method according to claim 14, wherein the at least a part of the layer is configured to be opaque and have a non-black color when the display is inactive, and wherein the display being inactive comprises the display being in at least one or more of: a power save mode, a partial display mode or an off mode.

18. The method according to claim 14, wherein the material is configured to be substantially white when no voltage is applied thereto.

19. A non-transitory computer readable medium embodying computer program code, which realizes the following when executed by a processor:
   determining an appearance which a layer of an electronic device is to assume, wherein the layer comprises a material which has an electrically controllable transparency and wherein at least a part of the layer is arranged to cover at least a part of a surface of a display of the electronic device, and wherein at least a part of the layer is configured to be opaque and have a non-black color when no voltage is applied to the at least a part of the layer; and
   causing an electrical control of the transparency of the layer in accordance with the determined appearance.

20. The non-transitory computer readable medium according to claim 19, wherein the at least a part of the layer is configured to be opaque and have a non-black color when the display is inactive, and wherein the display being inactive comprises the display being in at least one or more of: a power save mode, a partial display mode or an off mode.

21. The non-transitory computer readable medium according to claim 19, wherein the material is configured to be substantially white when no voltage is applied thereto.

* * * * *